UNITED STATES PATENT OFFICE.

WILHELM LOMMEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

GALLOCYANIN DYE.

No. 856,537.

Specification of Letters Patent.

Patented June 11, 1907.

Application filed March 18, 1907. Serial No. 363,009.

*To all whom it may concern:*

Be it known that I, WILHELM LOMMEL, doctor of philosophy, chemist, a citizen of the German Empire, residing at Elberfeld, Germany, Kingdom of Prussia, have invented new and useful Improvements in a New Dyestuff from Gallocyanin, of which the following is a specification.

I have found that a new coloring matter of the oxazin series is produced from gallocyanin (obtained by the action of nitrosodimethylanilin on gallic acid) by heating the gallocyanin base or its alkaline salts, either in suspension or in solution, until a test portion is soluble in hydrochloric acid of 20° Bé with a pure blue color and is insoluble in sodium carbonate solution. These tests readily distinguish the new dye from gallocyanin which is soluble in sodium carbonate solution and dissolves in hydrochloric acid of 20° Bé with a red color.

The following example will further illustrate my invention, the parts being by weight: To 33,6 parts of gallocyanin suspended in 650 parts of water, 27,2 parts of crystallized sodium acetate are added and the resulting mixture which has to be continuously stirred is heated to boiling at a reflux condenser for about 4—5 hours. The reaction is complete when the dyestuff filtered from a test portion dissolves in hydrochloric acid of 20° Bé with a pure blue color and is insoluble in sodium carbonate solution. The base is filtered off and converted into its hydrochlorid.

The hydrochlorid of the new dyestuff forms after drying a dark green powder soluble in water with a reddish-violet color. The new dye is distinguished from gallocyanin from which it is produced, by the greater solubility of its hydrochlorid and by giving in printing redder and purer shades. It yields upon reduction the leuco-compound described in my other application for Letters Patent of same date, Ser. No. 363,008.

Having now described my invention and in what manner the same is to be performed, what I claim as new and desire to secure by Letters Patent is:—

The herein-described new dyestuff obtainable from gallocyanin, which dyestuff is in the shape of its hydrochlorid after dyeing a dark green powder soluble in water with a reddish-violet color, being distinguished from gallocyanin by the greater solubility of its hydrochlorid and by giving in printing redder and purer shades than gallocyanin; being soluble in hydrochloric acid of 20° Bé with a pure blue color; and being insoluble in sodium carbonate solution, substantially as described.

In testimony whereof I have hereunto set my hand in the presence of two subscribing witnesses.

WILHELM LOMMEL. [L. S.]

Witnesses:
   OTTO KÖNIG,
   J. A. RITTERSHAUS.

It is hereby certified that in Letters Patent No. 856,537, granted June 11, 1907, upon the application of Wilhelm Lommel, of Elberfeld, Germany, for an improvement in "Gallocyanin Dyes," an error appears in the printed specification requiring correction, as follows: In line 51, the word "dyeing" should read *drying;* and that the said Letters Patent should be read with this correction therein that the same may conform to the record of the case in the Patent Office.

Signed and sealed this 16th day of July, A. D., 1907.

[SEAL.]

C. C. BILLINGS,
*Acting Commissioner of Patents..*